United States Patent [19]

Walling

[11] 4,194,844
[45] Mar. 25, 1980

[54] MULTIPLE POWDER CONVEYOR SYSTEM

[75] Inventor: Jorg-Hein Walling, St. Hubert, Canada

[73] Assignee: Northern Telecom Limited, Montreal, Canada

[21] Appl. No.: 876,874

[22] Filed: Feb. 13, 1978

[51] Int. Cl.² .......................... B01F 15/02; B01F 15/04
[52] U.S. Cl. .................................... 366/157; 198/662;
198/548; 366/294; 366/320
[58] Field of Search ............... 366/156, 157, 178, 293,
366/294, 162, 64, 79, 133; 198/662, 548, 558;
425/207, 208

[56] References Cited

U.S. PATENT DOCUMENTS

| | | | |
|---|---|---|---|
| 3,452,965 | 7/1969 | Leister | 366/293 |
| 3,612,130 | 10/1971 | Ponka | 366/294 |
| 3,802,551 | 4/1974 | Semers | 198/662 |
| 4,057,225 | 11/1977 | Ferree | 366/157 |

*Primary Examiner*—Robert W. Jenkins

[57] ABSTRACT

Apparatus for receiving and conveying a plurality of different powders simultaneously and delivering the powders continuously as a blended mix, in which a number of concentric tubes define annular bores carrying helical screw members driven at one end for axial rotation. At the delivery end the tubes are progressively inset from the outermost tube to the innermost tube. A core in the innermost tube defines the annular bore therein and is expanded diametrically at the delivery end of each tube to extend the annular bore to the end of that tube with the pitch of the helical screw member of that tube being increased over the expanded portion of the core to the end of the tube. Preferably the tubes, the helical screw members and the bore are laterally flexible.

5 Claims, 2 Drawing Figures

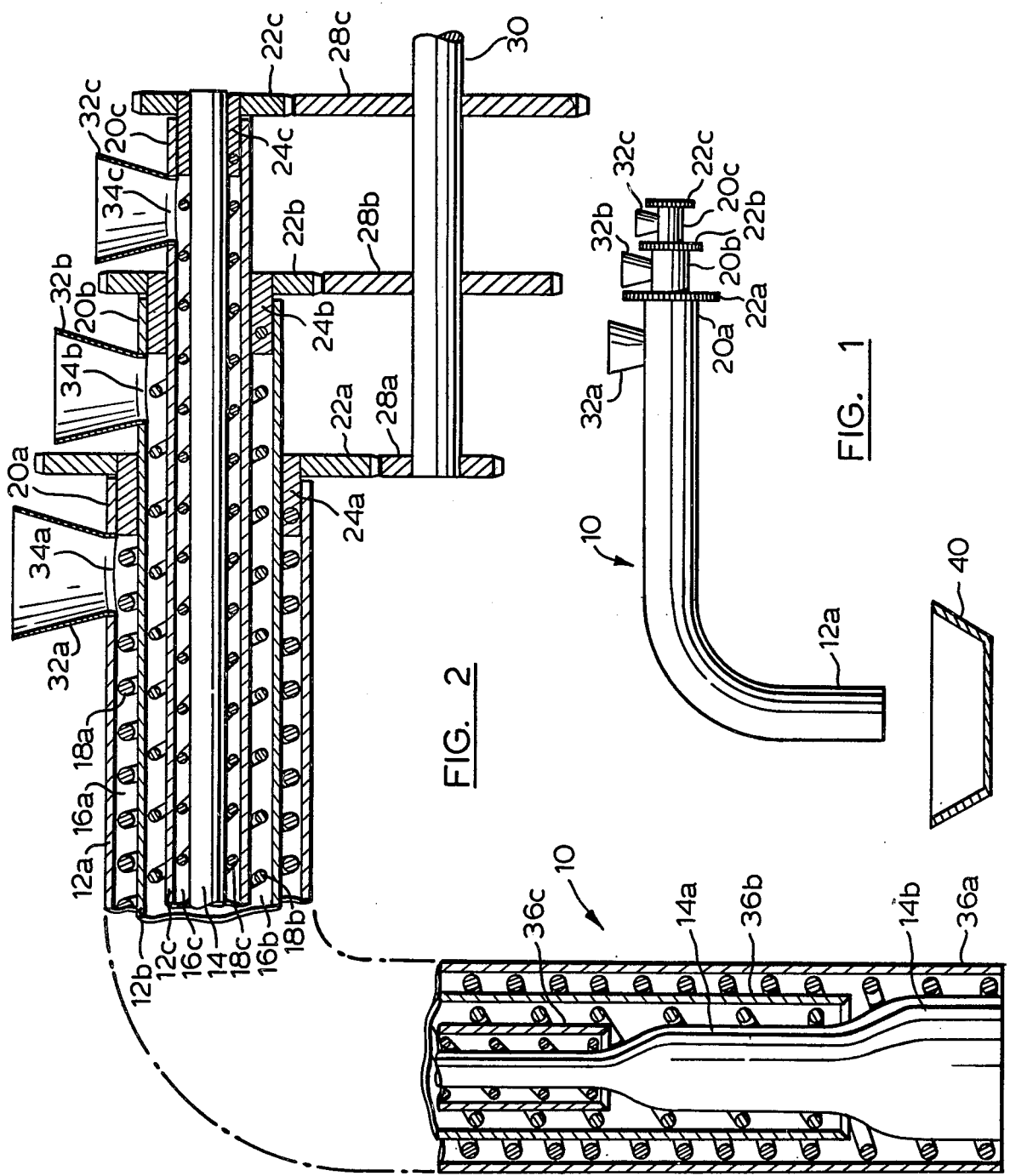

MULTIPLE POWDER CONVEYOR SYSTEM

This invention relates to an apparatus for conveying powdered material and more particularly to a device which will simultaneously collect and convey a plurality of different powders and deliver them in blended form.

Powder mixes of a plurality of ingredients are required for certain purposes such as filling the interstices of electrical cables. Such mixes must be prepared in batches or by feeding the ingredients into a hopper through individual conveyors or conduits. Helical or screw feeders may be used for this purpose.

It is an object of the present invention to provide an apparatus which will receive and convey a plurality of different powders simultaneously in a single conveyor and deliver them continuously in a predetermined blend.

In its broadest aspect the invention consists of an apparatus for receiving and conveying a plurality of different powders simultaneously and delivering said powders continuously as a blended powder mix, comprising: a plurality of concentric tubes spaced one from another to define annular bores therebetween, the innermost tube having an axial core to define an annular bore therein, each tube terminating in a receiving end and a delivery end; a plurality of helical members located one in each of said annular bores, each helical member being of predetermined pitch; each tube terminating at its delivery end short of the delivery end of the next outer tube and the core being expanded diametrically to extend the annular bore therebetween, the helical member of said annular bore being increased in pitch along said diametrically expanded portion of the core; each tube having means adjacent the receiving end thereof to pass powder to the helical member in the annular bore therein; and means to rotate each helical member axially.

An example embodiment of the invention is shown in the accompanying drawings in which:

FIG. 1 is a side view in elevation of a multiple powder conveyor; and

FIG. 2 is a cross-sectional view of the device of FIG. 1, including drive means.

The device shown in the example embodiment consists of a conveyor 10 having a plurality of concentric tubes 12 spaced one from another with the innermost tube housing a cylindrical core 14 located along the common axis of the tubes. Adjacent tubes 12 form annular bores 16 between them and each bore houses a helical screw member 18 turns of predetermined pitch, i.e. the turns being evenly spaced apart a predetermined amount. In the example embodiment each member 18 is a double helix i.e. it has two parallel helices.

At one end of the conveyor, the inlet or receiving end, the ends 20 of tubes 12 are longitudinally staggered and each tube has mounted on it a driven gear 22. An annular collar or hub 24 of each gear 22 projects into bore 16 of its associated tube and circumscribes the next inner tube (or core 14 in the case of the innermost tube). The ends of helical members 18 are fixed on hubs 24 and they are rotatable freely with members 18, in bores 16. Each gear 22 meshes with a drive gear 28 keyed on a disc shaft 30.

A hopper 32 is mounted on each tube 12 adjacent its receiving end 20 and opens into the tube annular bore 16 of that particular tube through an aperture 34 in the tube adjacent hub 24 of gear 22.

The example embodiment shows three concentric tubes 16 which are identified as an outer tube 16a, an intermediate tube 16b and an inner tube 16c. The elements associated with each tube 16a, 16b and 16c have been identified with like subscripts.

At the other end of conveyor 10, the outlet or delivery end, the ends 36 of tubes 20 are staggered with end 36b of tube 12b inset longitudinally from end 36a of tube 12a and end 36c of the tube 12c inset longitudinally from end 36b of tube 12b. Core 14 extends beyond end 36c of the tube 12c and its diameter is expanded to provide a length 14a serving as an extension of annular bore 16b. Core 14 further extends beyond end 36b of tube 12b and its diameter again increases to provide a length 14b serving as an extension of annular bore 16a. Helical members 18a, 18b and 18c terminate at ends 36a, 36b and 36c of tubes 12a, 12b and 12c respectively and core 14 terminates at end 36a of tube 12a. The pitch of helical member 18b is increased between ends 36c and 36b of tubes 12c and 12b, and the pitch of helical member 18a is increased between ends 36b and 36a of tubes 12b and 12a.

Tubes 12, core 14 and helical members 18 are preferably laterally flexible to allow conveyor 10 to bend about its longitudinal axis as seen in the drawings.

In the operation of the example embodiment conveyor 10 delivers a blended powder mix into a suitable receptacle 40 shown schematically in FIG. 2. The powder ingredients of the mix are introduced into conveyor 10, one through each hopper 32, and the powder is moved along the conveyor by helical members 18 which are rotated from drive shaft 30 through gears 28 and 22. As the powder in tube 12c emerges from end 36c it blends with the powder in tube 12b and the pitch of helical member 18b is greater at that point to accomodate the increased quantity of powder. For the same reason the pitch of helical member 18a is greater beyond end 36b of tube 12b. As the powder leaves end 36a of tube 12a it constitutes a blend or mix of the powders from all three tubes 12.

Of course only two of tubes 12 may be used to blend two powder ingredients and the number of tubes may be increased to mix a larger number of ingredients. The device is also useful to mix pigments and fillers with powder.

The device of the invention allows powders to be blended and delivered continuously rather than in batches. The speed of the device may be varied through the drive mechanism to provide a delivery rate equal to consumption, for instance to continuously replenish a hopper feeding a cable filling apparatus. The output of each helical member 18 depends upon its pitch, its inner and outer diameter and its speed. While the pitch and the diameter of each helical member 18 is predetermined in the construction of the device, the speed of each helical member may be varied by altering the gear ratios of the device.

I claim:

1. Apparatus for receiving and conveying a plurality of different powders simultaneously and delivering said powders continuously as a blended powder mix, comprising:

a plurality of concentric tubes spaced one from another to define annular bores therebetween, the innermost tube having an axial core to define an annular bore therein, each tube terminating in a receiving end and a delivery end;

a plurality of helical members located one in each of said annular bores, each helical member being of predetermined pitch;

each tube terminating at its delivery end short of the delivery end of the next outer tube and the core being expanded diametrically to extend the annular bore therebetween, the helical member of said annular bore being increased in pitch along said diametrically expanded portion of the core;

each tube having means adjacent the receiving end thereof to pass powder to the helical member in the annular bore therein; and means to rotate each helical member axially.

2. Apparatus as claimed in claim 1 in which the means to pass powder comprises a hopper opening through an aperture in the tube into the annular bore therein.

3. Apparatus as claimed in claim 1 in which the means to rotate each helical member comprises a gear concentrically mounted at the end of the tube having said helical member in the annular bore therein, the end of said helical member being fixed to the gear, the gear being freely rotatable with respect to the tube.

4. Apparatus as claimed in claim 3 in which the receiving ends of said tubes are progressively inset from the innermost tube to the outermost tube, the gear of each tube being fixed on a hub projecting into the end of said tube and circumscribing the next inner tube, the end of said helical member being fixed on the hub, the hub of the gear of the innermost tube circumscribing the core.

5. Apparatus as claimed in claim 1 in which the tubes, the helical members and the core are laterally flexible.

* * * * *